(12) United States Patent
Nishimura

(10) Patent No.: US 9,631,344 B1
(45) Date of Patent: Apr. 25, 2017

(54) WORK VEHICLE AND METHOD OF CONTROLLING WORK VEHICLE

(71) Applicant: KOMATSU LTD., Tokyo (JP)

(72) Inventor: Kazunori Nishimura, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/896,441

(22) PCT Filed: Oct. 9, 2015

(86) PCT No.: PCT/JP2015/078853
§ 371 (c)(1),
(2) Date: Dec. 7, 2015

(87) PCT Pub. No.: WO2016/043348
PCT Pub. Date: Mar. 24, 2016

(51) Int. Cl.
E02F 9/22 (2006.01)
E02F 9/08 (2006.01)
(Continued)

(52) U.S. Cl.
CPC .......... *E02F 9/2235* (2013.01); *B60W 10/06* (2013.01); *B60W 10/103* (2013.01);
(Continued)

(58) Field of Classification Search
CPC .... B60W 10/04; B60W 10/06; B60W 10/103; E02F 9/20; F01N 3/025; F01N 3/08; F01N 3/20
(Continued)

(56) References Cited

U.S. PATENT DOCUMENTS

2010/0122522 A1 5/2010 Tsukada et al.
2012/0152641 A1 6/2012 Takahashi et al.
(Continued)

FOREIGN PATENT DOCUMENTS

EP 2 187 012 A2 5/2010
EP 2 613 030 A1 7/2013
(Continued)

OTHER PUBLICATIONS

The extended European search report for the corresponding European application No. 15797830.5, issued on Sep. 16, 2016.
(Continued)

*Primary Examiner* — Patrick Maines
(74) *Attorney, Agent, or Firm* — Global IP Counselors, LLP

(57) ABSTRACT

A work vehicle includes an engine, a variable displacement hydraulic pump, a hydraulic motor, an exhaust treatment device, and a controller. The engine drives the variable displacement hydraulic pump. The variable displacement hydraulic pump is configured to change the discharge direction of the hydraulic fluid. Depending on the discharge direction of the hydraulic oil from the variable displacement hydraulic pump, the hydraulic motor is configured to change the driving direction to the forward direction or the reverse direction. The exhaust treatment device is configured to treat the exhaust from the engine. The controller is configured to increase the speed of the engine to a predetermined first speed or greater and to change the discharge direction of the variable displacement hydraulic pump to a neutral state during regeneration of the exhaust treatment device.

13 Claims, 7 Drawing Sheets

(51) Int. Cl.
*B60W 10/06* (2006.01)
*B60W 10/103* (2012.01)
*F15B 9/04* (2006.01)
*F15B 9/09* (2006.01)
*F01N 3/20* (2006.01)
*F01N 3/10* (2006.01)
*F02D 41/02* (2006.01)
*E02F 3/34* (2006.01)

(52) U.S. Cl.
CPC .......... *E02F 9/0866* (2013.01); *E02F 9/2253* (2013.01); *E02F 9/2296* (2013.01); *F01N 3/103* (2013.01); *F01N 3/2066* (2013.01); *F02D 41/027* (2013.01); *F15B 9/04* (2013.01); *F15B 9/09* (2013.01); *E02F 3/34* (2013.01); *F15B 2211/30525* (2013.01); *F15B 2211/85* (2013.01)

(58) Field of Classification Search
USPC .......................................................... 60/295
See application file for complete search history.

(56) References Cited

U.S. PATENT DOCUMENTS

| | | | | |
|---|---|---|---|---|
| 2012/0227388 A1* | 9/2012 | Asakage | ............... | E02F 9/2095 60/311 |
| 2013/0025262 A1 | 1/2013 | Yano et al. | | |
| 2013/0213020 A1 | 8/2013 | Ishikawa et al. | | |
| 2014/0008140 A1* | 1/2014 | Yoshida | ................ | F01N 3/0231 180/309 |
| 2014/0290237 A1* | 10/2014 | Yoshida | ................ | F02D 41/029 60/452 |
| 2016/0208665 A1* | 7/2016 | Koike | ................... | F02D 41/029 |
| 2016/0222858 A1* | 8/2016 | Iwata | ..................... | B60K 35/00 |

FOREIGN PATENT DOCUMENTS

| | | |
|---|---|---|
| JP | 7-166840 A | 6/1995 |
| JP | 2005-139944 A | 6/2005 |
| JP | 2010-77919 A | 4/2010 |
| JP | 2011-52794 A | 3/2011 |
| JP | 2013-96518 A | 5/2013 |
| JP | 2014-92102 A | 5/2014 |
| JP | 2015-7422 A | 1/2015 |
| JP | 2015-86714 A | 5/2015 |
| KR | 10-2014-0071023 A | 6/2014 |
| WO | 2011/125257 A1 | 10/2011 |

OTHER PUBLICATIONS

International Search Report for the corresponding international application No. PCT/JP2015/078853, issued on Dec. 15, 2015.

* cited by examiner

WORK VEHICLE AND METHOD OF CONTROLLING WORK VEHICLE

CROSS-REFERENCE TO RELATED APPLICATIONS

This application is a U.S. National stage application of International Application No. PCT/JP2015/078853, filed on Oct. 9, 2015.

FIELD OF THE INVENTION

A work vehicle and a method of controlling the work vehicle are disclosed.

BACKGROUND INFORMATION

Japanese Laid-Open Patent Application Publication No. 2011-052794 discloses a work vehicle provided with a variable displacement hydraulic pump driven by an engine, and a hydraulic motor driven by the hydraulic oil discharged from the variable displacement hydraulic pump. The work vehicle travels on the driving power from the hydraulic motor.

The tightening of emission controls in recent years has made it increasingly necessary to regenerate the exhaust treatment device mounted in this kind of work vehicle to maintain the purification performance of the exhaust treatment device. Regenerating an exhaust treatment device is performed when the purification performance of the device has deteriorated or when the device has been operating for over a predetermined time, and involves increasing the exhaust temperature to remove soot, urea deposits, or the like that have accumulated in the exhaust treatment device (refer to Japanese Laid-Open Patent Application Publication No. 2015-086714).

SUMMARY

The work vehicle in Japanese Laid-Open Patent Application Publication No. 2011-052794 requires increasing the engine speed to regenerate the exhaust treatment device. Once the engine speed has increased, the hydraulic motor is driven beyond the driving power corresponding to the accelerator operation amount, which tends to make it difficult to travel the work vehicle at the speed intended by the operator.

The present description discloses a work vehicle capable of traveling at the speed intended by the operator when regenerating the exhaust treatment device.

A work vehicle according to a first aspect of the present invention includes an engine, a variable displacement hydraulic pump, a hydraulic motor, an exhaust treatment device, and a controller. The engine drives the variable displacement hydraulic pump. The variable displacement hydraulic pump is configured to change the discharge direction of the hydraulic fluid. Depending on the discharge direction of the hydraulic oil from the variable displacement hydraulic pump, the hydraulic motor is configured to change the driving direction to the forward direction or the reverse direction. The exhaust treatment device is configured to treat the exhaust from the engine. The controller is configured to increase the speed of the engine to a predetermined first speed or greater and to change the discharge direction of the variable displacement hydraulic pump to a neutral state during regeneration of the exhaust treatment device.

The work vehicle may further include a forward-reverse travel switching valve for switching the discharge direction of the hydraulic oil from the variable displacement hydraulic pump. The controller may be configured to switch the discharge direction of the variable displacement hydraulic pump to the neutral state by switching the forward-reverse travel switching valve to a neutral state.

The work vehicle may be provided with a pump capacity control cylinder configured to change the capacity and the discharge direction from the variable displacement hydraulic pump in accordance with a supply direction, which is the direction the hydraulic oil is supplied from the forward-reverse travel switching valve.

The work vehicle may be further provided with a fixed displacement hydraulic pump, and an engine sensing valve. The engine drives the fixed displacement hydraulic pump. The engine sensing valve is configured to convert the hydraulic pressure of the hydraulic oil discharged from the fixed displacement hydraulic pump to a hydraulic pressure corresponding to the engine speed, and to supply the converted hydraulic oil to the forward-reverse travel switching valve. The pump capacity control cylinder may be configured to change the capacity of the variable displacement hydraulic pump to a capacity at a level capable of traveling the vehicle when the engine speed is a first speed, and the forward-reverse travel switching valve is in a forward travel state or a reverse travel state.

The controller may be configured to increase the low idle engine speed during the regeneration of the exhaust treatment device.

The exhaust treatment device may be a selective catalytic reduction device. The regeneration of the exhaust treatment device may be started when the removal efficiency in the exhaust treatment device for a removal object to be removed becomes less than a predetermined value, or when a predetermined time or greater has elapsed since the latest regeneration.

The exhaust treatment device may be a diesel oxidation catalyst device. The regeneration of the exhaust treatment device may be started when a first predetermined time or greater has elapsed since the temperature of the exhaust from the exhaust treatment device during the operation of the engine becomes no greater than a first predetermined temperature.

The controller may be configured to switch the forward-reverse travel switching valve to the neutral state when an accelerator operation amount is less than a predetermined first operation amount, and the vehicle speed is less than a predetermined speed.

The regeneration of the exhaust treatment device may be finished when a second predetermined time or greater has elapsed since the temperature of the exhaust from the exhaust treatment device becomes no less than a second predetermined temperature.

The regeneration of the exhaust treatment device may be finished when a third predetermined time or greater has elapsed since the regeneration is started.

The controller may be configured to finish the control switching the forward-reverse travel switching valve to the neutral state when the regeneration of the exhaust treatment device is finished, and the engine speed becomes less than a predetermined second speed which is less than the first speed.

The controller may be configured to finish the control switching the forward-reverse travel switching valve to the neutral state when the accelerator operation amount becomes a first operation amount or greater.

A method of controlling a work vehicle according to the second aspect of the present invention involves steps of causing the engine to drive a hydraulic pump having a variable discharge direction of hydraulic oil discharged therefrom; driving a hydraulic motor for travelling a vehicle with the hydraulic oil discharged from the hydraulic pump; switching the discharge direction of the hydraulic pump to a neutral state; increasing the speed of the engine to at or above a predetermined first speed; and regenerating an exhaust treatment device.

The work vehicle according to the first aspect, and the method of controlling a work vehicle according to the second aspect increases the speed of the engine to a predetermined first speed or greater and switches the discharge direction of the hydraulic pump to a neutral state when regenerating the exhaust treatment device. Therefore, the vehicle speed does not increase even when the engine speed is increased for the purpose of regenerating the exhaust treatment device. Consequently, the vehicle may travel at the speed intended by the operator.

DESCRIPTION OF EXEMPLARY EMBODIMENTS

Overall Configuration

Figure 1:
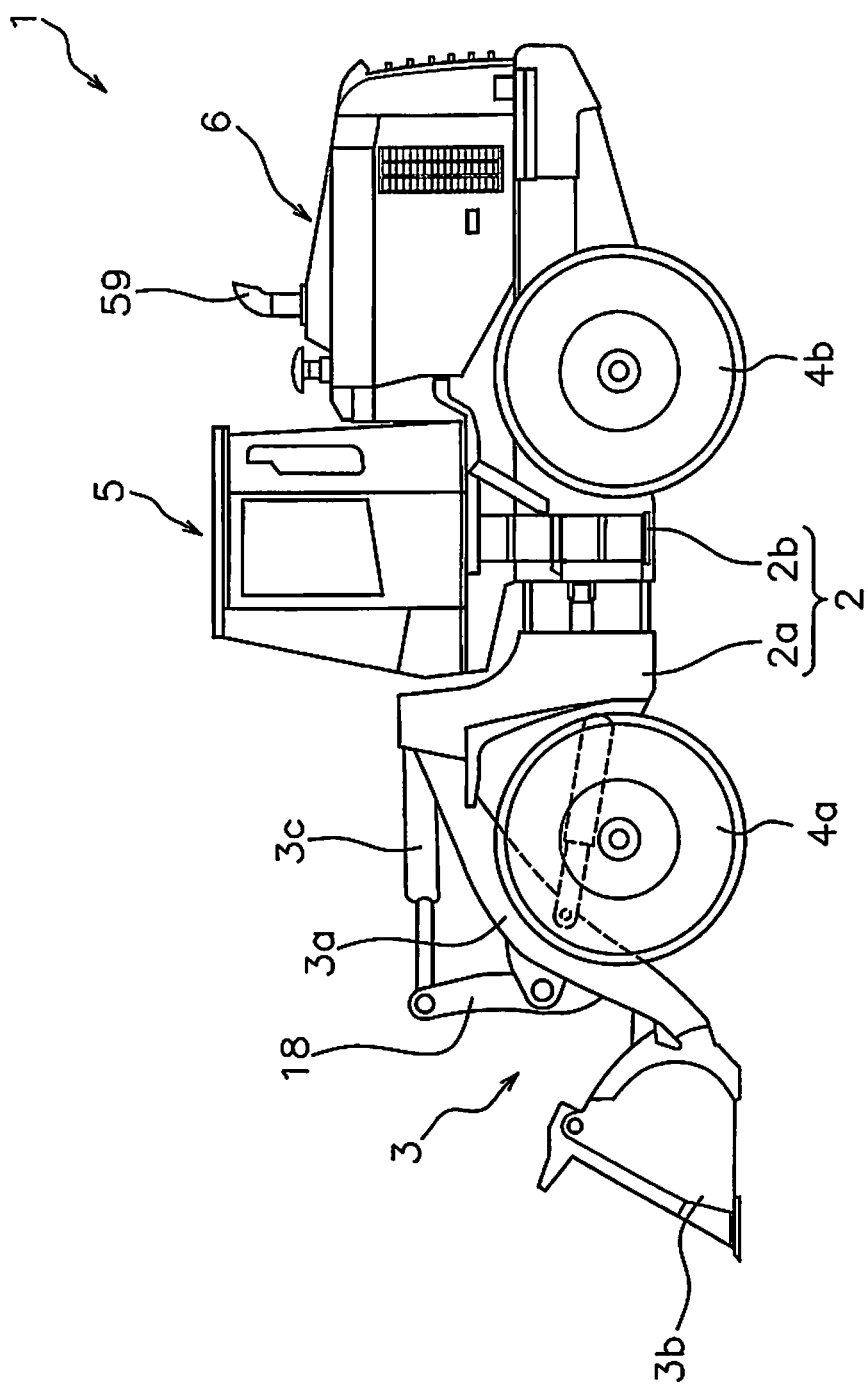
FIG. 1 is a side view of a work vehicle.

A side view of a work vehicle 1 according to an exemplary embodiment of the present invention is illustrated in FIG. 1. The work vehicle 1 is a wheel loader capable of traveling via tires 4a, 4b and carrying out the desired work via a working implement 3. The work vehicle 1 is provided with a vehicle frame 2, a working implement 3, tires 4a, 4b, and a cab 5.

The vehicle frame 2 contains a front frame 2a, and a rear frame 2b arranged behind the front frame. The front frame 2a and the rear frame 2b are connected at the center of the vehicle frame 2 and are able to pivot horizontally thereat.

The working implement 3 and the pair of front tires 4a are installed on the front frame 2a. The hydraulic oil from a working-implement hydraulic pump 11 (refer to FIG. 3) drives the working implement 3 which is provided with a lift arm 3a mounted to the front of the front frame 2a, a bucket 3b installed on the tip end of the lift arm 3a, a lift cylinder (not shown) that drives the lift arm 3a, and a tilt cylinder 3c that drives the bucket 3b. The pair of front tires 4a is provided on the sides of the front frame 2a.

The cab 5, an engine compartment 6, and the pair of rear tires 4b are provided on the rear frame 2b. The cab 5 is installed on the upper part of the vehicle frame 2. Control units, such as a steering wheel and an accelerator pedal 61 (refer to FIG. 3); a display unit (not shown) for displaying various kinds of information, such as the vehicle speed; an operator seat; and the like, can be installed within the cab 5. The engine compartment 6 is arranged behind the cab 5. The pair of rear tires 4b is provided on the sides of the rear frame 2b.

Figure 2:
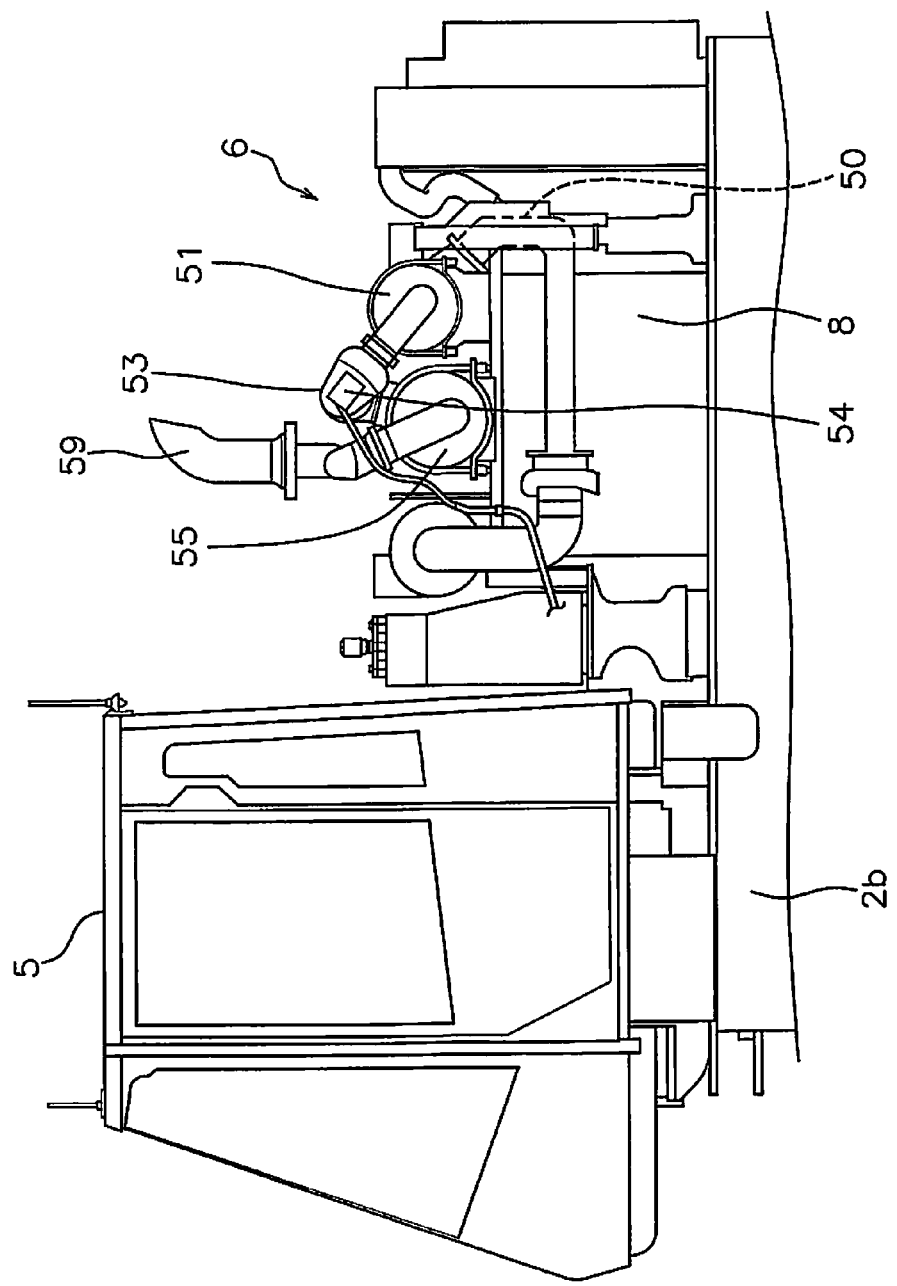
FIG. 2 is a side view illustrating a configuration of the inside of the engine compartment.

FIG. 2 is a side view illustrating a configuration of the inside of the engine compartment 6. As illustrated in FIG. 2, an engine 8, a first exhaust treatment device 51, and a second exhaust treatment device 55 are arranged inside the engine compartment 6.

The engine 8 is a so-called diesel engine. The engine 8 drives the above-described tires 4a, 4b and the hydraulic pumps 9, 11 (refer to FIG. 3). The engine 8 is supported on the rear frame 2b.

The first exhaust treatment device 51 is arranged above the engine 8. The first exhaust treatment device 51 treats the exhaust from the engine 8. The first exhaust treatment device 51 is, for example, a diesel oxidation catalyst (DOC) device. The DOC device oxidizes the nitrogen oxide (NO) and nitrogen dioxide (NO2) present in the exhaust from the engine 8 and facilitates exhaust treatment in the second exhaust treatment device 55. The DOC device further removes the hydrocarbon (HC) and the carbon monoxide (CO) in the exhaust from the engine 8. The first exhaust treatment device 51 is a roughly circular cylinder. The first exhaust treatment device 51 is arranged such that the lengthwise direction thereof follows the width of the vehicle. The first exhaust treatment device 51 is connected to the engine 8 via a first connecting pipe 50.

The second exhaust treatment device 55 is arranged above the engine 8 adjacent to the first exhaust treatment device 51. The second exhaust treatment device 55 treats the exhaust from the engine 8. The second exhaust treatment device 55 is, for example, a selective catalytic reduction (SCR) device. The SCR device uses a reductant to remove the nitrogen oxides (NOx) in the exhaust from the engine 8. That is, the NOx are the objects to be removed by the second exhaust treatment device 55. The second exhaust treatment device 55 is a roughly circular cylinder. The second exhaust treatment device 55 is arranged such that the lengthwise direction thereof follows the width of the vehicle. The second exhaust treatment device 55 is connected to the first exhaust treatment device 51 via a second connecting pipe 53.

The second connecting pipe 53 is arranged above the second exhaust treatment device 55. A reductant injector 54 is installed on the second connecting pipe 53. The reductant injector 54 injects the reductant into the second connecting pipe 53. The reductant may be an aqueous solution of urea. The second connecting pipe 53 mixes the reductant with the exhaust from the engine 8.

An exhaust pipe 59 is connected to the second exhaust treatment device 55. The exhaust pipe 59 is arranged above the second exhaust treatment device 55. Above the second exhaust treatment device 55, the exhaust pipe 59 extends along the width of the vehicle, and bends upward. As illustrated in FIG. 1, the tip end portion of the exhaust pipe 59 protrudes upward from the upper surface of the engine compartment 6. The tip end portion of the exhaust pipe 59 curves rearward.

Hydraulic Driving Mechanism

A hydraulic driving mechanism 7 is mounted on the vehicle frame 2 to drive the tires 4a, 4b and the working implement 3. A configuration of the hydraulic driving mechanism 7 is described below based on FIG. 3. The hydraulic driving mechanism 7 contains primarily, the engine 8, a hydraulic pump for traveling (travel hydraulic pump) 9, a charge pump 10, a hydraulic pump for actuating working implement (working-implement hydraulic pump) 11, a hydraulic motor for traveling (travel hydraulic motor) 12, a drive shaft 15, and a controller 16, and adopts the so-called hydro-static transmission (HST) system.

The output torque generated by the engine 8 is transmitted to the travel hydraulic pump 9, the charge pump 10, and the working-implement hydraulic pump 11, and the like. A fuel injector 17 is provided to the engine 8 for controlling the output torque and the speed of the engine 8. The fuel injector 17 adjusts the amount of fuel injected on the basis of a commanded speed signal from the controller 16 to the engine 8; the commanded speed signal is adjusted depending on an amount the accelerator pedal 61 is operated (referred to below as an "accelerator operation amount").

The accelerator pedal 61 is a means of directing the target speed of the engine 8, and is provided with an accelerator operation amount detector 62. The accelerator operation amount detector 62 is configured from a potentiometer to detect the accelerator operation amount. The accelerator operation amount detector 62 sends the controller 16 an operation amount signal indicative of the accelerator operation amount, and outputs the command signal from the controller 16 to the fuel injector 17. Therefore, the operator may control the speed of the engine 8 by adjusting the operation amount entered via the accelerator pedal 61.

The engine 8 is also provided with an engine-speed detector 25 configured from a rotation sensor that detects the actual rotation speed of the engine 8. A detection signal indicative of the engine speed is sent from the engine-speed detector 25 to the controller 16.

The travel hydraulic pump 9 is a variable displacement hydraulic pump that changes the capacity and the discharge direction of the hydraulic oil therefrom in accordance with a change in the tilt angle of the swashplate. The engine 8 drives the travel hydraulic pump 9. The hydraulic oil discharged from the travel hydraulic pump 9 is sent to the travel hydraulic motor 12 through hydraulic circuits for traveling (travel circuits) 20, 21. The travel circuit 20 (referred to below as the "forward travel circuit 20") is a flow path supplying the travel hydraulic motor 12 with hydraulic oil so that driving the travel hydraulic motor 12 causes the vehicle to move forward. The travel circuit 21 (referred to below as the "reverse travel circuit 21") is a flow path supplying the travel hydraulic motor 12 with hydraulic oil so that driving the travel hydraulic motor 12 causes the vehicle to move in reverse.

A pump capacity control cylinder 23 and a forward-reverse travel switching valve 24 are connected to the travel hydraulic pump 9; the pump capacity control cylinder 23 is able to change the tilt angle of the swashplate in the travel hydraulic pump 9.

The pump capacity control cylinder 23 moves a piston 22 in accordance with the pressure of the hydraulic oil supplied thereto. A spring 22a is installed on the piston 22. The pump capacity control cylinder 23 includes a first hydraulic chamber 23a and a second hydraulic chamber 23b; the location of the piston 22 changes depending on the balance between the force of the spring, and a pressure differential between the hydraulic pressures inside the first hydraulic chamber 23a and the second hydraulic chamber 23b respectively. The piston 22 is connected to the swashplate in the travel hydraulic pump 9, and the movement of the piston 22 changes the tilt angle of the swashplate in the travel hydraulic pump 9. Hereby, the pump capacity control cylinder 23 is able to vary the capacity and the discharge direction of the hydraulic oil from the travel hydraulic pump 9.

The forward-reverse travel switching valve 24 is an electromagnetic control valve that controls the pump capacity control cylinder 23 on the basis of a command signal from the controller 16. The forward-reverse travel switching valve 24 is able to control the direction the hydraulic oil is supplied to the pump capacity control cylinder 23 on the basis of a command signal from the controller 16. Consequently, the controller 16 may switch the discharge direction of the hydraulic oil from the travel hydraulic pump 9 by controlling the forward-reverse travel switching valve 24 electrically. The forward-reverse travel switching valve 24 can switch between a forward-travel state F, a reverse-travel state R, and a neutral state N.

In the forward-travel state F, the forward-reverse travel switching valve 24 links a later-described first pilot circuit 36 and the main pilot circuit 33, and connects a second pilot circuit 37 and a drain circuit 38. The first pilot circuit 36 is connected to the first hydraulic chamber 23a in the pump capacity control cylinder 23. The second pilot circuit 37 is connected to the second hydraulic chamber 23b in the pump capacity control cylinder 23. Therefore, when the forward-reverse travel switching valve 24 is in the forward-travel state F, hydraulic oil is supplied to the first hydraulic chamber 23a via the main pilot circuit 33 and the first pilot circuit 36, and discharged from the second hydraulic chamber 23b. Hereby, the tilt angle in the travel hydraulic pump 9 changes to an orientation that increases the capacity in the forward travel circuit 20.

In addition, in the reverse-travel state R, the forward-reverse travel switching valve 24 links the second pilot circuit 37 and the main pilot circuit 33, and connects the first pilot circuit 36 and the drain circuit 38. Therefore, when the forward-reverse travel switching valve 24 is in the reverse-travel state R, hydraulic oil is supplied to the second hydraulic chamber 23b via the main pilot circuit 33 and the second pilot circuit 37. Hereby, the tilt angle in the travel hydraulic pump 9 changes to an orientation that increases the capacity in the reverse travel circuit 21.

The first pilot circuit 36 and the second pilot circuit 37 are connected to the drain circuit 38 in the neutral state N of the forward-reverse travel switching valve 24. In this case, the travel hydraulic pump 9 does not discharge hydraulic oil to either of the forward travel circuit 20 or the reverse travel circuit 21. The discharge direction of the hydraulic oil from the travel hydraulic motor 12 at this point is said to be in the neutral state.

The charge pump 10 is a fixed displacement hydraulic pump that discharges hydraulic oil when driven by the engine 8. The hydraulic oil discharged from the charge pump 10 is normally supplied to the forward-reverse travel switching valve 24 through a charge circuit 42, an engine sensing valve 32, and the main pilot circuit 33. The charge pump 10 supplies the forward-reverse travel switching valve 24 with the hydraulic oil that operates the pump capacity control cylinder 23.

Figure 4:
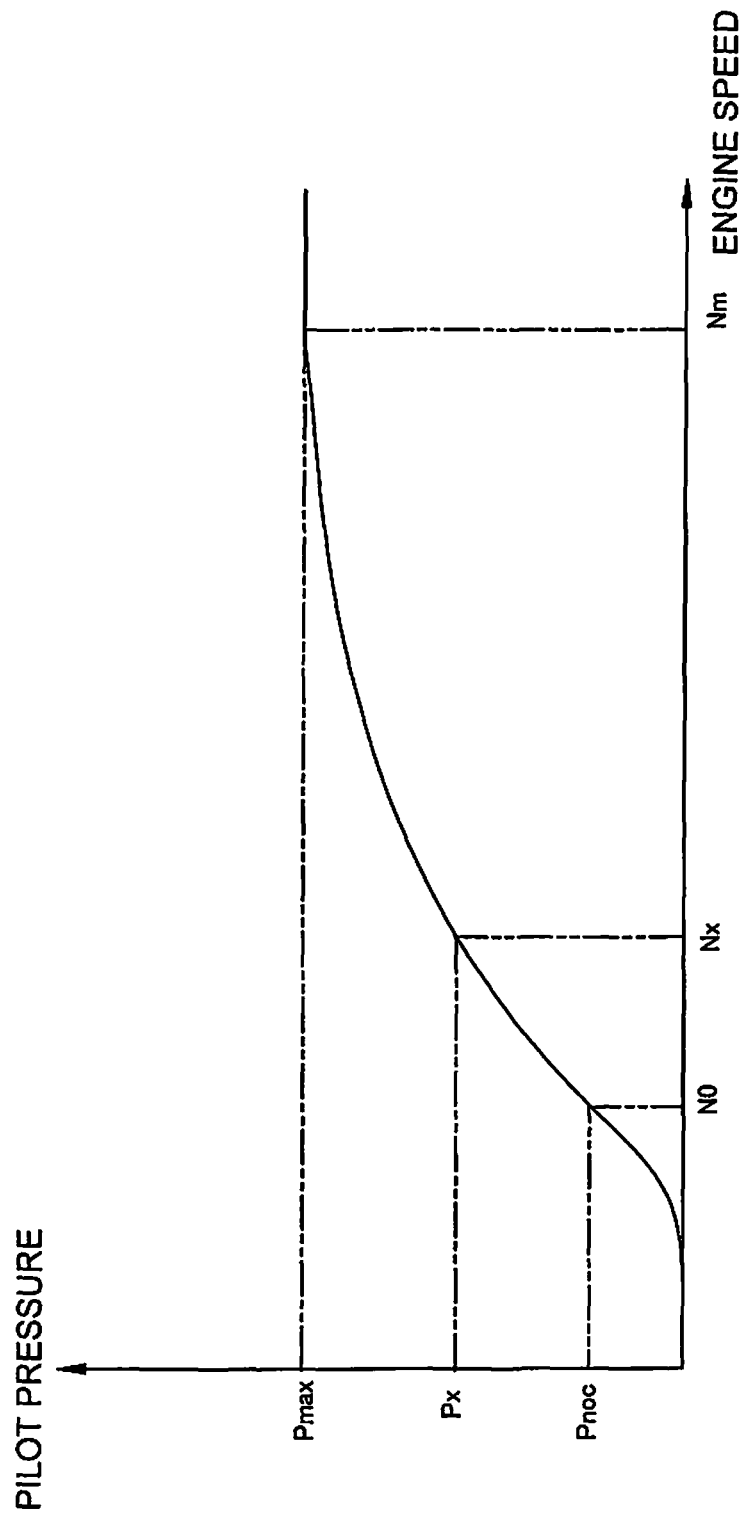
FIG. 4 is a graph illustrating the relationship between the engine speed and the pilot pressure in the engine sensing valve.

The engine sensing valve 32 converts the hydraulic pressure of the hydraulic oil discharged from the charge pump 10 to a hydraulic pressure that corresponds to the engine speed, and supplies the converted hydraulic oil to the forward-reverse travel switching valve 24. The engine sensing valve 32 changes the pressure in the main pilot circuit 33 (i.e., the pilot pressure) in accordance with the engine speed. FIG. 4 is a graph illustrating the relationship in the engine sensing valve 32 between the engine speed and the pilot pressure.

As illustrated in FIG. 4, when the engine speed increases the engine sensing valve 32 increases the pilot pressure. The variable Pnoc in FIG. 4 is the minimum required pilot pressure needed in the pump capacity control cylinder 23 to move the piston 22. In other words, when the pilot pressure is greater than Pnoc, the pressure differential between the hydraulic pressure inside the first hydraulic chamber 23a and the hydraulic pressure inside the second hydraulic chamber 23b is greater than the biasing force of the spring 22a and the piston 22 moves. The low idle speed of the engine 8 during normal operation (i.e., the engine speed when no load is applied to the engine) is smaller than the engine speed N0 corresponding to Pnoc. Consequently, the discharge direction of the hydraulic oil from the travel hydraulic motor 12 is in the neutral state when the accelerator operation amount is zero during normal operation, and the work vehicle does not move.

When the engine speed is Nx (N0<Nx<Nm) illustrated in FIG. 4, the piston 22 moves to a location where the pilot pressure Px corresponding to the engine speed Nx and the spring force of the spring 22a are balanced thereby setting the capacity of the travel hydraulic pump 9. When the engine speed is greater than or equal to Nm illustrated in FIG. 4, a later-described cut-off valve 31 operates to thereby set the pilot pressure at a maximum value Pmax. At this point, the piston 22 moves up to the location where the pilot pressure Pmax and the spring force of the spring 22a are balanced, thereby setting the capacity of the travel hydraulic pump 9. In this manner, the engine sensing valve 32 changes the pilot pressure, to thereby increase or decrease the capacity of the travel hydraulic pump 9 as above described.

Figure 3:
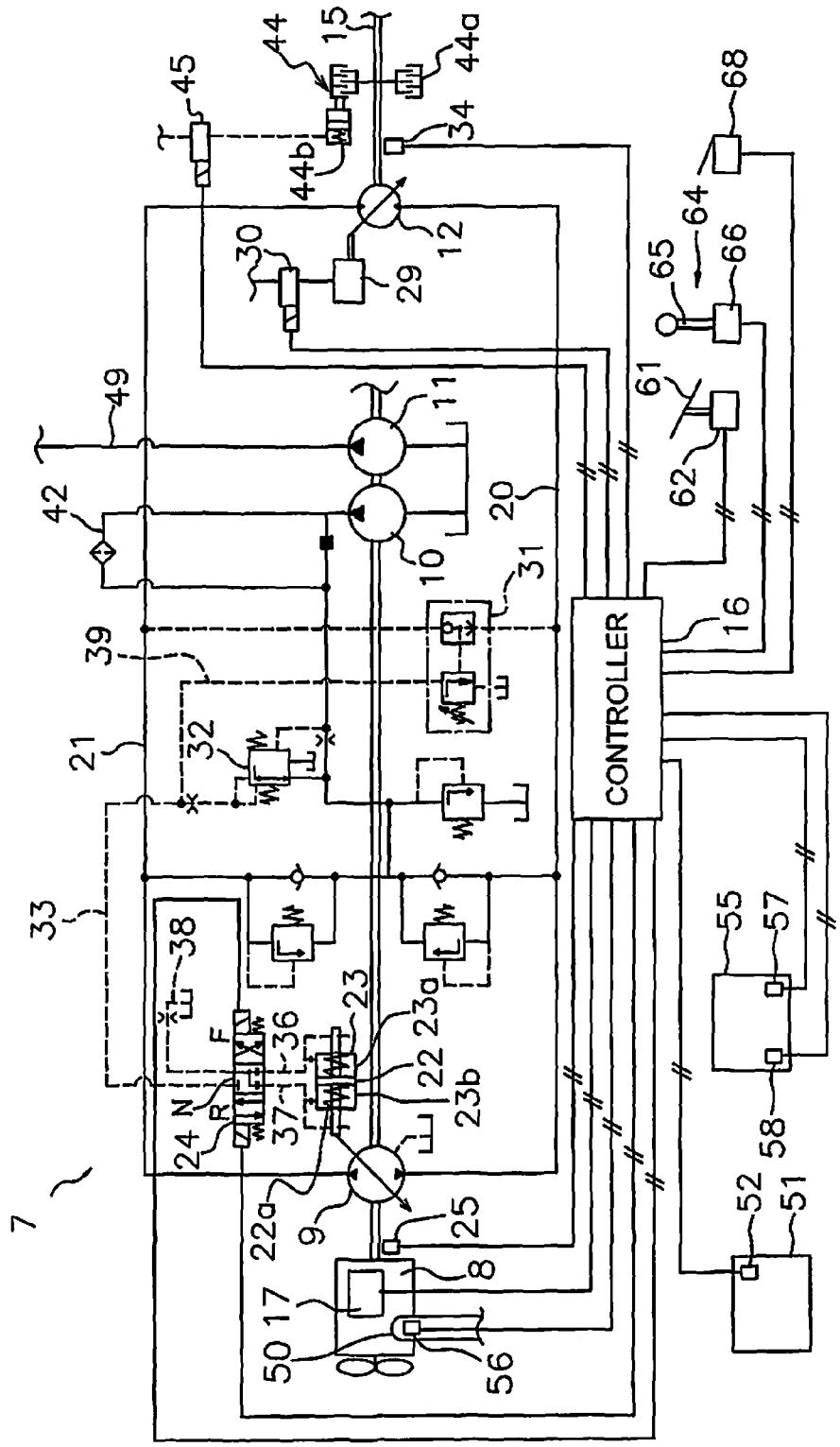
FIG. 3 illustrates a configuration of a hydraulic driving mechanism provided to the work vehicle.

In FIG. 3, a cut-off circuit 39, which is connected to the cut-off valve 31, is connected to the main pilot circuit 33. The cut-off valve 31 is a pressure reducing valve that reduces the pilot pressure in the pump capacity control cylinder 23 to an established pressure by balancing the hydraulic pressure in the travel circuits 20, 21 (referred to below as the "travel circuit hydraulic pressure") and the spring force. The cut-off valve 31 limits the pilot pressure to the maximum pilot pressure Pmax in FIG. 4. The cut-off valve 31 is configured to reduce the pilot pressure supplied to the pump capacity control cylinder 23 when the travel circuit hydraulic pressure is at or exceeds an established cut-off pressure value to thereby ensure that the travel circuit hydraulic pressure does not exceed the cut-off pressure value.

The engine 8 drives the working-implement hydraulic pump 11. The hydraulic oil discharged from the working-implement hydraulic pump 11 is sent, for instance, to the tilt cylinder 3c via the work-machine circuit 49 (refer to FIG. 1) to drive the tilt cylinder 3c.

The travel hydraulic motor 12 is a variable displacement hydraulic motor, the capacity of which changes within a range of values greater than zero in accordance with a change in the tilt angle of the swashplate. The hydraulic oil supplied to the travel hydraulic motor 12 from the travel hydraulic pump 9 via the travel circuits 20, 21 drives the travel hydraulic motor 12. Hereby, the travel hydraulic motor 12 generates the driving power that causes the vehicle to move.

Depending on the discharge direction of the hydraulic oil from the travel hydraulic pump 9, the travel hydraulic motor 12 changes the driving direction to the forward direction or the reverse direction. More specifically, the travel hydraulic motor 12 is driven in a direction that causes the vehicle to move forward when the hydraulic oil is supplied via the forward travel circuit 20. The travel hydraulic motor 12 is driven in a direction that causes the vehicle to move in reverse when the hydraulic oil is supplied via the reverse travel circuit 21.

A motor cylinder 29, and a motor control valve 30 are provided in the travel hydraulic motor 12; the motor cylinder 29 controls the tilt angle in the travel hydraulic motor 12, and the motor control valve 30 controls the motor cylinder 29. The motor control valve 30 is an electromagnetic control valve controlled on the basis of a control signal from the controller 16. The controller 16 is capable of changing the capacity of the travel hydraulic motor 12 as desired by controlling the motor cylinder 29.

The drive shaft 15 causes the tires 4a, 4b to rotate by transmitting the driving power from the travel hydraulic motor 12 to the tires 4a, 4b (refer to FIG. 1). The drive shaft 15 is also provided with an output speed detector 34 configured from a rotation sensor that detects the rotation speed of the drive shaft 15. The information detected by the output speed detector 34 is sent to the controller 16 as a detection signal. The controller 16 computes the moving direction and speed of the vehicle on the basis of the rotation speed of the drive shaft 15 detected by the output speed detector 34. Note that the vehicle speed in the exemplary embodiment is a scalar value defined in accordance to magnitude and is not dependent on the moving direction of the work vehicle 1.

A parking brake 44, and a parking brake control valve 45 are further provided on the drive shaft 15. The parking brake 44 can switch between an engaged state, and a disengaged state. In the engaged state the parking brake 44 stops the drive shaft 15. In the disengaged state the parking brake 44 releases the drive shaft 15.

The parking brake control valve 45 is an electromagnetic control valve controlled on the basis of a control signal from the controller 16. The controller 16 controls the parking brake control valve 45 to thereby switch the parking brake 44 between the engaged state and the disengaged state. The parking brake 44 can switch between the engaged state and the disengaged state in accordance with the operation of a parking brake operation member 68.

The parking brake 44 contains a brake disc portion 44a, and a piston portion 44b. When the piston portion 44b is supplied with hydraulic fluid, the oil pressure causes the piston portion 44b and the plurality of brake disks in the brake disc portion 44a to come in contact with each other. The parking brake 44 is thereby in the engaged state. Switching the parking brake 44 to the engaged state may also be referred to as operating the parking brake 44. Additionally, discharging hydraulic oil from the piston portion 44b causes the piston portion 44b and the brake discs to be held out of contact with each other due to the elastic force of an elastic component provided in the piston portion 44b. The parking brake 44 is thereby in the disengaged state.

The parking brake operation member 68 is provided in the cab 5, and is manipulated to operate the parking brake 44. The parking brake operation member 68 may be, for instance, a braking switch, or a parking lever that the operator can manipulate. Finally, an operation signal is sent to the controller 16 when the parking brake operation member 68 is operated.

A forward-reverse switching control unit 64 contains a forward-reverse switching lever 65 and a lever-operation detector 66 which serve as the forward-reverse travel operation control. The operator operates the forward-reverse switching lever 65, located in the cab 5, to direct switching the vehicle between forward travel and reverse travel. The forward-reverse switching lever 65 may be switched between a forward-travel position, a reverse-travel position, and a neutral position. The lever-operation detector 66 detects to which of the positions, i.e., the forward-travel position, the reverse-travel position, and the neutral position that the forward-reverse switching lever 65 has been switched, and sends the detection result to the controller 16 as a detection signal.

The first connecting pipe 50 connected to the engine 8 is provided with a first concentration measurement unit 56. The first concentration measurement unit 56 is configured from a nitrogen oxide detector or the like for detecting the concentration of the NOx in the exhaust discharged from the engine 8. The first concentration measurement unit 56 sends a signal to the controller 16 representing a concentration D1 of the NOx present in the exhaust discharged from the engine 8.

A first temperature detector 52 is provided in the first exhaust treatment device 51. The first temperature detector 52 is configured from a temperature sensor or the like to detect the temperature of the exhaust from the first exhaust treatment device 51 (referred to below as the DOC temperature). The first temperature detector 52 sends a signal to the controller 16 representing the DOC temperature.

The second exhaust treatment device 55 is provided with a second temperature detector 57 and a second concentration measurement unit 58. The second temperature detector 57 is configured from a temperature sensor or the like to detect the temperature of the exhaust from the second exhaust treatment device 55 (referred to below as the SCR temperature). The second temperature detector 57 sends a signal to the controller 16 representing the SCR temperature. The second concentration measurement unit 58 is configured from a nitrogen oxide detector or the like for detecting the concentration of the NOx in the exhaust discharged from the second exhaust treatment device 55. The second concentration measurement unit 58 sends a signal to the controller 16 representing a concentration D2 of the NOx present in the exhaust discharged from the second exhaust treatment device 55.

The controller 16 is any electronic control unit including, for instance, a CPU and various kinds of memory. The controller 16 is programmed to electrically control the various electromagnetic valves and the fuel injector 17 on the basis of the signals output from the detectors. Hereby, the controller 16 controls the engine speed, the capacity of the motor, and the like. In the work vehicle 1, the traction force and the vehicle speed are continuously varied so that gear shifting occurs automatically between a vehicle speed of zero to a maximum speed without a gear shifting operation.

The controller 16 usually outputs a commanded speed signal to the fuel injector 17 which sets the speed of the engine 8 in accordance with the accelerator operation amount. The controller 16 also outputs a command signal on the basis of the position of the forward-reverse switching lever 65 to change the state (F, R, N) of the forward-reverse travel switching valve 24. For instance, when the forward-reverse switching lever 65 is moved to the forward-travel position, the controller 16 outputs a command signal that changes the state of the forward-reverse travel switching valve 24 to the forward-travel state F.

Whereas, when determining that the exhaust treatment devices 51, 55 need regeneration, even when the accelerator operation amount is small, the controller 16 outputs a commanded speed signal to the fuel injector 17 that adjusts the speed of the engine 8 to a predetermined speed or greater. Moreover, when the accelerator operation amount, vehicle speed, and the like satisfy a predetermined condition during regeneration of the exhaust treatment devices 51, 55, the controller 16 outputs a command signal that sets the forward-reverse travel switching valve 24 to the neutral state N, regardless of the position of the forward-reverse switching lever 65. In other words the controller 16 switches the discharge direction of the travel hydraulic pump 9 to a neutral state. The details regarding the control performed by the controller 16 are described below.

Regenerating the Exhaust Treatment Device

Figure 5:
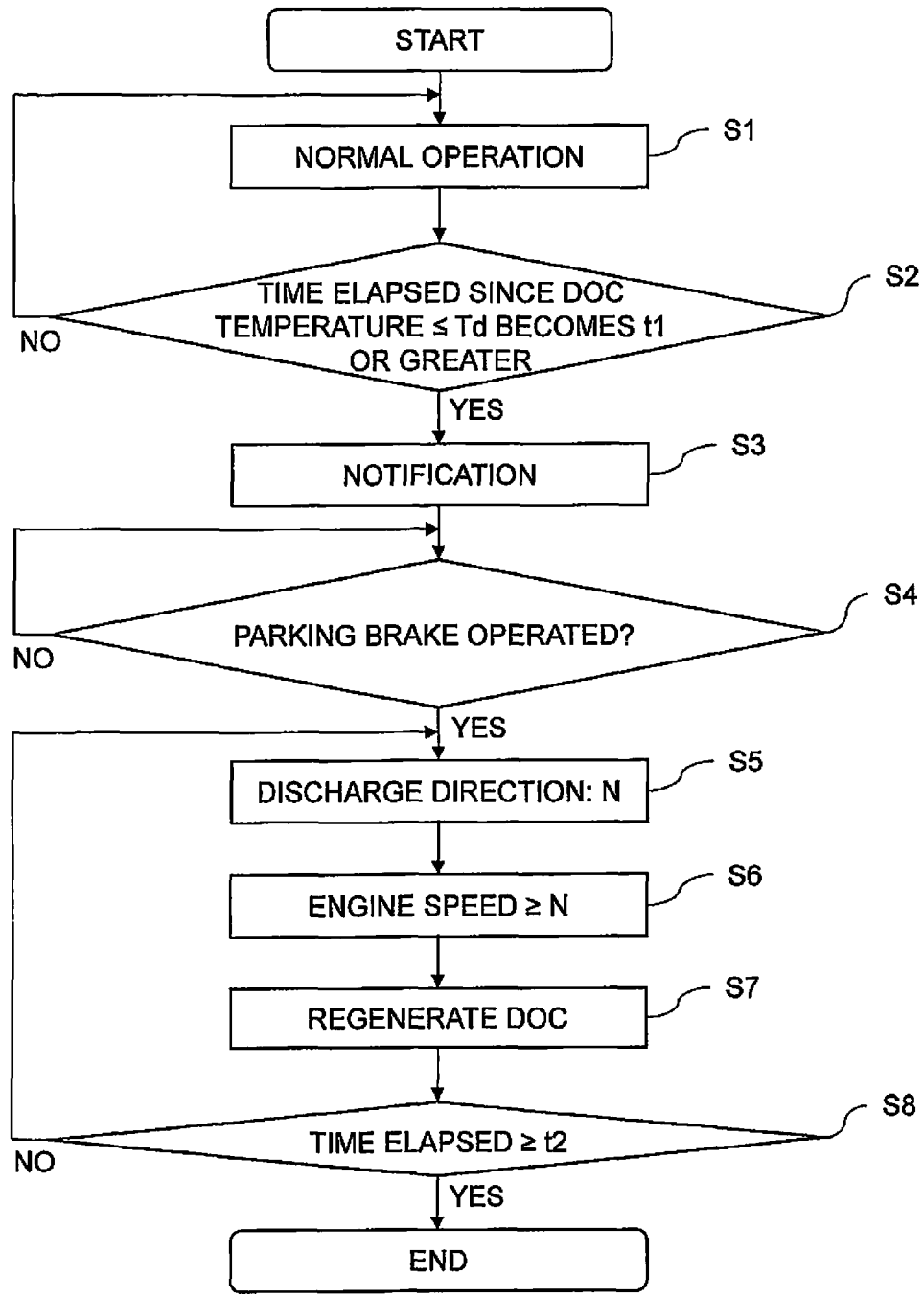
FIG. 5 is a flowchart illustrating operations in the work vehicle when regenerating a first exhaust treatment device.

FIG. 5 is a flowchart illustrating operations in the work vehicle 1 when regenerating the first exhaust treatment device 51 (DOC) according to the exemplary embodiment. First, the work vehicle 1 operates normally in step 1. More specifically, the controller 16 causes the engine 8 to drive the travel hydraulic pump 9, and causes the hydraulic oil discharged from the travel hydraulic pump 9 to drive the travel hydraulic motor 12.

In step 2 the controller 16 determines, on the basis of DOC temperature detected by the first temperature detector 52, whether or not a predetermined time t1 or greater has elapsed since the DOC temperature becomes no greater than a predetermined temperature Td during the operation of the engine 8. The control returns to step 1 when less than the predetermined time t1 has elapsed since the DOC temperature becomes the predetermined temperature Td (NO at step 1).

When the predetermined time t1 or greater has elapsed since the DOC temperature becomes the predetermined temperature Td (YES at step 2), in step 3, the controller 16 outputs an alert on the display unit or the like mounted inside the cab 5 prompting for the regeneration the first exhaust treatment device 51. Subsequently, the controller 16 waits until the parking brake 44 is operated (NO at step S4). The controller 16 operates the parking brake 44 when the operator operates the parking brake operation member 68 (YES at step 4).

When the parking brake is operated (YES at step 4), in step 5 the controller 16 effects a switch of the discharge direction of the travel hydraulic pump 9 to the neutral state. More specifically, the controller 16 causes the forward-reverse travel switching valve 24 to switch to the neutral state N.

In step 6, the controller 16 causes the engine speed to increase to or above a predetermined speed N1 regardless of the magnitude of the accelerator operation amount. The speed N1 is greater than the speed N0 in FIG. 4. Given that the low idle engine speed during normal operations is smaller than N0, this signifies that the controller 16 is increasing the low idle engine speed in step 6.

Increasing the engine speed to N1 or greater in step 6 raises the temperature of the exhaust from the engine 8. The hydrocarbons filling the first exhaust treatment device 51 are thereby oxidized and exhausted from the first exhaust treatment device 51. In this manner, the controller 16 effects regeneration of the first exhaust treatment device 51 in step 7.

In step 8, the controller 16 measures an amount of time elapsed since the regeneration of the first exhaust treatment device 51 and determines whether or not the amount of time elapsed becomes a predetermined time a or greater. The control returns to step 5 when the amount of time elapsed is less than the predetermined time t2 (NO at step 8). When the amount of time elapsed becomes the predetermined time 12 or greater (YES at step 8), the controller 16 causes the regeneration of the first exhaust treatment device 51 to be finished.

Figure 6:
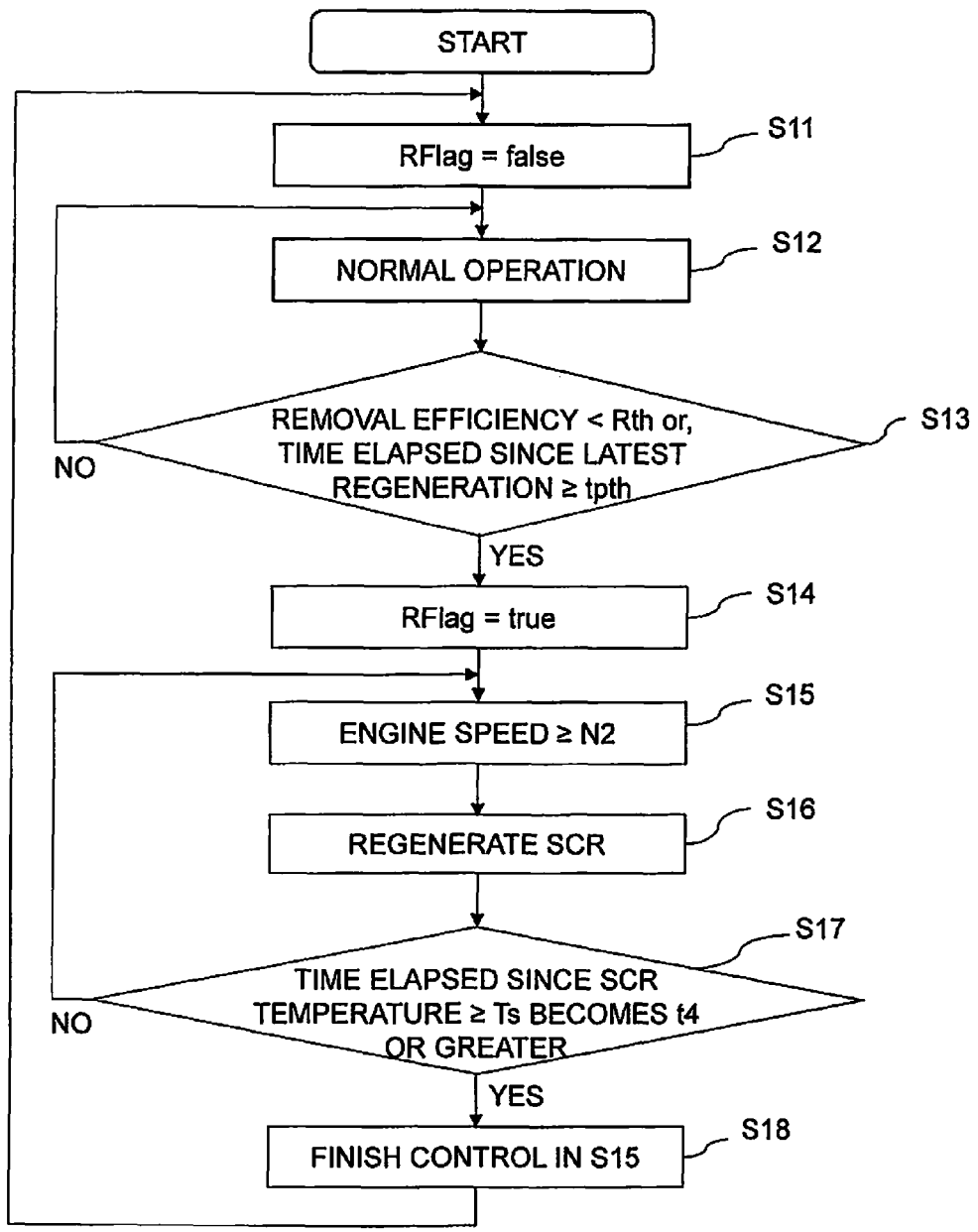
FIG. 6 is a flowchart illustrating operations in the work vehicle when regenerating a second exhaust treatment device.

FIG. 6 is a flowchart illustrating operations during regeneration of the second exhaust treatment device 55 (SCR)

according to the exemplary embodiment. First, in step 11 the controller 16 sets a variable RFlag to false on startup of the work vehicle 1. RFlag is a flag indicating whether or not the conditions for regenerating the SCR (later described) are met. In this case RFlag indicates that the conditions for regenerating the SCR are not met.

The work vehicle 1 operates normally in step 12. More specifically, the controller 16 causes the engine 8 to drive the travel hydraulic pump 9, and causes the hydraulic oil discharged from the travel hydraulic pump 9 to drive the travel hydraulic motor 12.

In the step 13, the controller 16 determines whether the removal efficiency of an object to be removed (NOx) from the second exhaust treatment device 55 (SCR) becomes less than a predetermined value Rth, or whether or not a predetermined time tpth or greater has elapsed since the latest regeneration of the second exhaust treatment device 55.

The controller 16 acquires the concentration D1 of NOx within the exhaust discharged from the engine 8 as detected by a first concentration measurement unit 56, and a concentration D2 of NOx within the exhaust discharged from the second exhaust treatment device 55 as detected by a second concentration measurement unit 58. The controller 16 uses an expression (1−D2/D1) to compute the NOx removal efficiency.

In step 13, the control returns to step 12 when the NOx removal efficiency is at a predetermined value Rth or greater, and less than a predetermined time tpth has elapsed since the latest regeneration (NO at step 13). Otherwise, the controller 16 sets the RFlag to true when that is not the case (YES at step 13). In this case RFlag indicates that the conditions for regenerating the SCR are met.

In step 15, the controller 16 causes the engine speed to increase to or above a predetermined speed N2 regardless of the magnitude of the accelerator operation amount. The speed N2 is greater than the speed N0 in FIG. 4. Given that the low idle engine speed during normal operation is smaller than N0, this signifies that in step 15 the controller 16 is increasing the low idle engine speed. Note that here, the speed N2 may be the same as the speed N1 in step 6 of FIG. 5.

Increasing the engine speed to N2 or greater in step 15 raises the temperature of the exhaust from the engine 8. Hereby, the increased temperature of the exhaust thermally decomposes the fixed deposits (deposit) in the second connecting pipe 53 and the reductant injector 54 created due to the chemical transformation of the reductant solution. In this manner, the controller 16 effects regeneration of the second exhaust treatment device 55 in step 16.

In step 17 the controller 16 determines whether or not a predetermined time t4 or greater has elapsed since the SCR temperature detected by the second temperature detector 57 becomes a predetermined temperature Is or greater. The control returns to step 15 when less than the predetermined time t4 has elapsed since the SCR temperature becomes the predetermined temperature Is or greater (NO at step 17).

In step 18 the controller 16 finishes the control in step 15 when the predetermined time t4 or more has elapsed since the SCR temperature becomes the predetermined temperature Is or greater (YES at step 17). That is, the controller 16 causes the speed of the engine 8 to be established in accordance with the accelerator operation amount. In this manner, the controller 16 finishes the control of the regeneration of the second exhaust treatment device 55. The control returns to the processing in step 11 after the completion of step 18.

Figure 7:
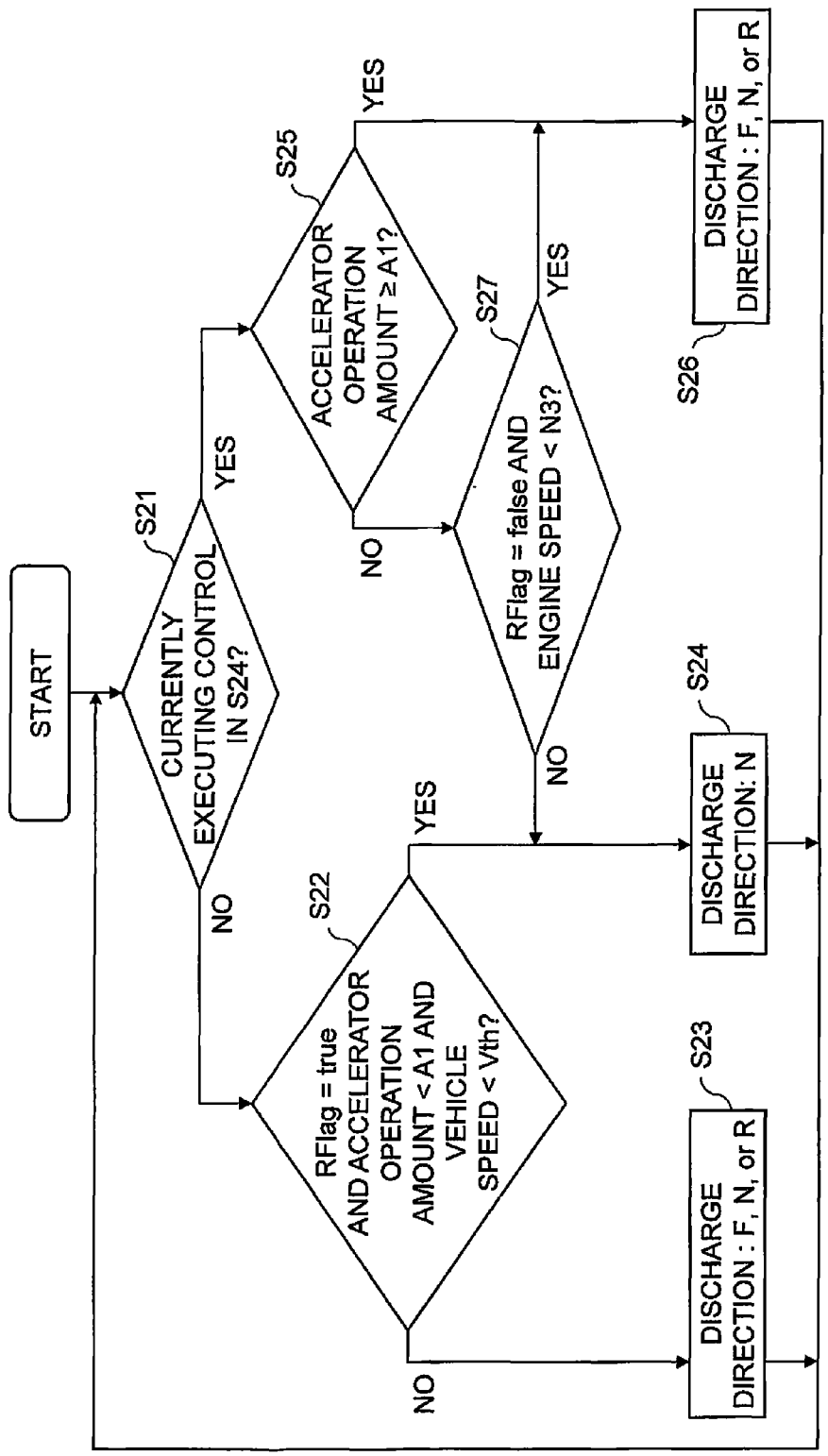
FIG. 7 is a flowchart illustrating operations in the hydraulic driving mechanism when regenerating the second exhaust treatment device.

FIG. 7 is a flowchart illustrating operations in the hydraulic driving mechanism 7 when regenerating the second exhaust treatment device 55 (SCR) according to the exemplary embodiment. In step 21 the controller 16 determines whether or not control to set the discharge direction of the hydraulic oil from the travel hydraulic motor 12 to the neutral state (step 24, later described) is being carried out. Prior to the SCR regeneration process in step 16 (FIG. 6), there is no processing carried out to set the discharge direction of the hydraulic oil to the neutral state (NO at step 21). In this case, the control proceeds to step 22.

In step 22 the controller 16 determines whether or not the RFlag is true, the accelerator operation amount detected by the accelerator operation amount detector 62 is less than a predetermined operation amount A1, and the vehicle speed obtained from the rotation speed of the drive shaft 15 detected by the output speed detector 34 is less than a predetermined speed Vth.

When the RFlag is true, the accelerator operation amount detected by the accelerator operation amount detector 62 is less than a predetermined operation amount A1, and the vehicle speed is less than a predetermined speed Vth (YES at step 22), the controller 16 controls the switching of the discharge direction of the travel hydraulic pump 9 to the neutral state. More specifically, the controller 16 causes the forward-reverse travel switching valve 24 to switch to the neutral state N regardless of the position of the forward-reverse switching lever 65.

When the RFlag is false, the accelerator operation amount is the predetermined operation amount or greater A1, or the vehicle speed is the predetermined speed Vth or greater (NO at step 22), the controller 16 does not perform the control in step 24. Namely, in step 23, the controller 16 outputs a command signal on the basis of the position of the forward-reverse switching lever 65 to set the discharge direction of the travel hydraulic pump 9 and to change the state (F, R, N) of the forward-reverse travel switching valve 24.

Once step 23 or step 24 is carried out, the controller 16 performs the processing in step 21 again. When the control in step 24 has already been carried out (YES at step 21), the controller 16 determines whether or not the accelerator operation amount detected by the accelerator operation amount detector 62 is a predetermined operation amount A1 or greater in step 25.

When the accelerator operation amount is an operation amount A1 or greater (YES at step 25), in step 26 the controller 16 ends the control performed in step 24 for switching the forward-reverse travel switching valve 24 to the neutral state N. Namely, the controller 16 outputs a command signal on the basis of the position of the forward-reverse switching lever 65 to set the discharge direction of the travel hydraulic pump 9 and to change the state (F, R, N) of the forward-reverse travel switching valve 24. The control returns to the processing in step 21 after the completion of step 26.

When the accelerator operation amount is less than the operation amount A1 (NO at step 25), the controller 16 determines whether or not the RFlag is false, and whether the engine speed detected by the engine-speed detector 25 is less than a predetermined speed N3 which is smaller than the above described N2 in step 27. The speed N3 is smaller than the speed N0 in FIG. 4. Consequently, hereafter even if the forward-reverse travel switching valve 24 is switched to the forward-travel state F, or the reverse-travel state R, the travel hydraulic pump 9 does not discharge hydraulic oil into either of the forward travel circuit 20, or the reverse travel circuit 21 and the travel hydraulic motor 12 does not generate any driving power for travel.

When it is determined that the RFlag is false in step 27, this signifies that the processing in step 24 is carried out before the aforementioned determination; i.e., that the RFlag is true. Consequently, when it is determined that the RFlag is false in step 27, this signifies that the SCR regeneration process is completed.

The controller 16 carries out the processing in the above-described step 26 when the RFlag is false, and the engine speed is less than the speed N3 (YES at step 27). The controller 16 carries out the processing in the above-described step 24 when either the RFlag is true, or the engine speed is the speed N3 or greater (NO at step 27). The control returns to the processing in step 21 after the completion of step 24 or 26.

Operation Effects

Next, the operational effects of the exemplary embodiment are described.

The controller 16 according to the exemplary embodiment increases the speed of the engine 8 to a predetermined speed N1, N2 or greater (step 6 in FIG. 5, step 15 in FIG. 6) during regeneration of the exhaust treatment devices 51, 55 (step 7 in FIG. 5, step 16 in FIG. 6), and switches the forward-reverse travel switching valve 24 to the neutral state N (step 5 in FIG. 5, step 24 in FIG. 7) to switch the discharge direction of the hydraulic oil flowing from the travel hydraulic pump 9 to the neutral state. Thus, when the accelerator operation amount is small during low speeds (step 22 in FIG. 7), this prevents increases in the vehicle speed even when the engine speed is increased to regenerate the exhaust treatment devices 51, 55. This also prevents the generation of creep, which causes the work vehicle 1 to move even when the accelerator pedal 61 has not been pressed. Consequently, the vehicle may travel at the speed intended by the operator.

The speeds N1, N2 are greater than the engine speed N0 in FIG. 4. With the greater speeds N1, N2, when the forward-reverse travel switching valve 24 is switched completely to either the forward-travel state F or the reverse-travel state R, the movement of the piston 22 in the pump capacity control cylinder 23 causes the travel hydraulic pump 9 to discharge hydraulic fluid. The range of variable capacities for the travel hydraulic motor 12 is greater than zero; therefore, the travel hydraulic motor 12 will cause the drive shaft 15 to rotate and reeves thereby causes the vehicle to move when the travel hydraulic pump 9 discharges hydraulic fluid. Accordingly, setting the forward-reverse travel switching valve 24 to the neutral state N is effective.

The controller 16 increases the low idle speed to no less than N1 or N2 during regeneration of the exhaust treatment devices 51, 55. Consequently, the temperature of the exhaust from the engine 8 can be raised even when the accelerator operation amount is zero, allowing more reliable regeneration of the exhaust treatment devices 51, 55.

The regeneration of the first exhaust treatment device 51 (DOC) can be started when a predetermined time t1 or greater has elapsed since the temperature of the exhaust from the first exhaust treatment device 51 (DOC temperature) during the operation of the engine 8 becomes no greater than a predetermined temperature Td. The first exhaust treatment device 51 is filled with hydrocarbons when the DOC temperature is low. Therefore, this allows effective detection of when an abundance of hydrocarbons are in the first exhaust treatment device 51, allowing for effective regeneration of the first exhaust treatment device 51.

The regeneration of the first exhaust treatment device 51 is finished when the amount of time elapsed since the regeneration of the first exhaust treatment device 51 is started becomes a predetermined time t2 or greater. This enables to finish the regeneration of the first exhaust treatment device 51 while the hydrocarbons filling the first exhaust treatment device 51 have been sufficiently removed therefrom.

The regeneration of the second exhaust treatment device 55 (SCR) can be started when the removal efficiency in the second exhaust treatment device 55 for a removal object to be removed (NOx) becomes less than a predetermined value Rth (step 13 in FIG. 6). Accordingly, the regeneration of the second exhaust treatment device 55 can be started when the removal performance of the second exhaust treatment device 55 deteriorates. Moreover, the regeneration of the second exhaust treatment device 55 can be started when a predetermined time tpth or greater has elapsed since the latest regeneration. This hereby allows for periodic maintenance of the second exhaust treatment device 55.

The regeneration of the second exhaust treatment device 55 (SCR) is finished when a predetermined time t4 or greater has elapsed since the temperature of the exhaust from the second exhaust treatment device 55 (SCR temperature) becomes no greater than a predetermined temperature Ts. The deposits filling inside the second connecting pipe 53 and the reductant injector 54 may be thermally decomposed effectively when the SCR temperature becomes Ts or greater. This enables to finish the regeneration of the second exhaust treatment device 55 while the hydrocarbons filling the second connecting pipe 53 and the reductant injector 54 have been sufficiently removed therefrom.

The controller 16 switches the forward-reverse travel switching valve 24 to the neutral state N (step 24 in FIG. 7) when the accelerator operation amount is less than a predetermined operation amount A1, and the vehicle speed is less than a predetermined speed Vth (step 22 in FIG. 7). Hereby, the controller 16 can switch the discharge direction of the travel hydraulic pump 9 to a neutral state when the operator desires low-speed, decelerating travel. Accordingly, the work vehicle 1 may function without obstructing the operator's intent.

The controller 16 ends the control switching the forward-reverse travel switching valve 24 to the neutral state N (step 26 in FIG. 7) when the accelerator operation amount is an operation amount A1 or greater (step 25 in FIG. 7). Hereby, the controller 16 can end the control switching the discharge direction of the travel hydraulic pump 9 to a neutral state when the operator desires accelerating travel. This improves the operational feel perceived by the operator.

The controller 16 finishes the control switching the forward-reverse travel switching valve 24 to the neutral state N (step 26 in FIG. 7) when the regeneration of the second exhaust treatment device 55 (SCR) finishes, and the engine speed becomes less than a speed N3 which is less than the above-described speed N2 (step 27 in FIG. 7). The speed N3 is smaller than the speed N0 in FIG. 4. Consequently, hereafter even if the forward-reverse travel switching valve 24 is switched to the forward-travel state F, or the reverse-travel state R, the travel hydraulic pump 9 does not discharge hydraulic oil into either of the forward travel circuit 20, or the reverse travel circuit 21 and the travel hydraulic motor 12 does not generate any driving power for travel. Accordingly, the controller 16 can return the work vehicle 1 to normal operation without the operator perceiving an interruption, even if the regeneration of the second exhaust treatment device 55 is finished while the work vehicle 1 is stopped.

Here ends the description of one exemplary embodiment of the present invention; the present invention is not limited to these descriptions but may be modified in various ways insofar as the modifications do not deviate from the spirit of the present invention.

Modification Examples

Although a wheel loader is provided as an example of the work vehicle 1 in the above exemplary embodiment, the work vehicle 1 may be any other work vehicle such as a bulldozer.

The above exemplary embodiment provides a DOC as an example of the first exhaust treatment device 51, and an SCR as an example of the second exhaust treatment device 55. However, instead of a DOC, a diesel particulate collection filter (DPF) device may be used as the first exhaust treatment device 51. In this case, the techniques for regenerating the first exhaust treatment device 51 are not limited to the techniques illustrated in FIG. 5.

For instance, step 3 illustrated in FIG. 5 may be omitted. Furthermore, while FIG. 7 provides examples of using the same threshold A1 as the threshold for the accelerator operation amount in step 22 and step 25, different thresholds may be used.

For instance, step 4 illustrated in FIG. 5 may be omitted. In other words, the forward-reverse travel switching valve 24 may be switched to the neutral state N without determining whether or not the parking brake 44 is operated.

It is not absolutely required for the first concentration measurement unit 56 is placed in the first connecting pipe 50. The first concentration measurement unit 56 may be arranged at any desired location, so long as that location is further upstream than the inlet to the second connecting pipe 53.

Herein is provided a work vehicle capable of traveling at the speed intended by an operator when regenerating an exhaust treatment device.

The invention claimed is:

1. A work vehicle comprising:
   an engine;
   a variable displacement hydraulic pump having a variable discharge direction, and driven by the engine;
   a hydraulic motor configured to change a driving direction to a forward direction or a reverse direction depending on the discharge direction of the hydraulic oil from the variable displacement hydraulic pump;
   an exhaust treatment device configured to treat exhaust from the engine; and
   a controller configured to increase a speed of the engine to a predetermined first speed or greater and to change the discharge direction of the variable displacement hydraulic pump to a neutral state during regeneration of the exhaust treatment device.

2. The work vehicle according to claim 1, further comprising
   a forward-reverse travel switching valve for switching the discharge direction of the hydraulic oil from the variable displacement hydraulic pump,
   the controller being configured to switch the discharge direction of the variable displacement hydraulic pump to the neutral state by switching the forward-reverse travel switching valve to a neutral state.

3. The work vehicle according to claim 2, further comprising
   a pump capacity control cylinder configured to change the capacity and the discharge direction from the variable displacement hydraulic pump in accordance with a supply direction, which is a direction the hydraulic oil is supplied from the forward-reverse travel switching valve.

4. The work vehicle according to claim 3, further comprising
   a fixed displacement hydraulic pump driven by the engine; and
   an engine sensing valve configured to convert a hydraulic pressure of the hydraulic oil discharged from the fixed displacement hydraulic pump to a hydraulic pressure corresponding to the engine speed, and to supply the converted hydraulic oil to the forward-reverse travel switching valve,
   the pump capacity control cylinder being configured to change the capacity of the variable displacement hydraulic pump to a capacity at a level capable of travelling the vehicle when the engine speed is a first speed, and the forward-reverse travel switching valve is in the forward travel state or the reverse travel state.

5. The work vehicle according to claim 1, wherein
   the controller is configured to increase a low idle engine speed during the regeneration of the exhaust treatment device.

6. The work vehicle according to claim 2, wherein
   the exhaust treatment device is a selective catalytic reduction device; and
   the regeneration of the exhaust treatment device is started when a removal efficiency in the exhaust treatment device for a removal object to be removed becomes less than a predetermined value, or when a predetermined time or greater has elapsed since the latest regeneration.

7. The work vehicle according to claim 1, wherein
   the exhaust treatment device is a diesel oxidation catalyst (DOC) device; and
   the regeneration of the exhaust treatment device is started when a first predetermined time or greater has elapsed since the temperature of the exhaust from the exhaust treatment device during the operation of the engine becomes no greater than a first predetermined temperature.

8. The work vehicle according to claim 6, wherein
   the controller is configured to switch the forward-reverse travel switching valve to the neutral state when an accelerator operation amount is less than a predetermined first operation amount, and the vehicle speed is less than a predetermined speed.

9. The work vehicle according to claim 8, wherein
   the controller is configured such that the regeneration of the exhaust treatment device is finished when a second predetermined time or greater has elapsed since the temperature of the exhaust from the exhaust treatment device becomes no less than a second predetermined temperature.

10. The work vehicle according to claim 7, wherein
    the controller is configured such that the regeneration of the exhaust treatment device is finished when a third predetermined time or greater has elapsed since the regeneration is started.

11. The work vehicle according to claim 9, wherein
    the controller is configured to finish the control switching the forward-reverse travel switching valve to the neutral state when the regeneration of the exhaust treatment device is finished, and the engine speed becomes less than a predetermined second speed which is less than the first speed.

12. The work vehicle according to claim 8, wherein the controller is configured to finish the control switching the forward-reverse travel switching valve to the neutral state when the accelerator operation amount becomes a first operation amount or greater.

13. A method of controlling a work vehicle, the method comprising steps of:
   driving a hydraulic pump having a variable discharge direction of hydraulic oil by an engine;
   driving a hydraulic motor configured to generate driving power for traveling with the hydraulic oil discharged from the hydraulic pump;
   regenerating an exhaust treatment device: and
   switching the discharge direction of the hydraulic pump to a neutral state and increasing the speed of the engine to a predetermined first speed or greater during the regenerating of the exhaust treatment device.

* * * * *